US010291891B2

(12) United States Patent
Chen et al.

(10) Patent No.: US 10,291,891 B2
(45) Date of Patent: May 14, 2019

(54) METHOD AND APPARATUS FOR CONTROLLING A LASER PROJECTION DEVICE

(71) Applicants:HISENSE CO., LTD., Qingdao (CN); HISENSE USA CORPORATION, Suwanee, GA (US); HISENSE INTERNATIONAL CO., LTD., Qingdao (CN)

(72) Inventors: Xu Chen, Qingdao (CN); Zheng Li, Qingdao (CN); Jichen Xiao, Qingdao (CN)

(73) Assignees: HISENSE CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 42 days.

(21) Appl. No.: 15/445,944

(22) Filed: Feb. 28, 2017

(65) Prior Publication Data

US 2018/0176522 A1 Jun. 21, 2018

(30) Foreign Application Priority Data

Dec. 21, 2016 (CN) .......................... 2016 1 1189393

(51) Int. Cl.
*H04N 9/31* (2006.01)
*H04N 9/12* (2006.01)
*G01J 5/10* (2006.01)

(52) U.S. Cl.
CPC ............. *H04N 9/3194* (2013.01); *G01J 5/10* (2013.01); *H04N 9/3155* (2013.01); *H04N 9/3161* (2013.01)

(58) Field of Classification Search
CPC .................................................. H04N 9/3194

(Continued)

(56) References Cited

U.S. PATENT DOCUMENTS 5,394,035 A * 2/1995 Elwell ...................... H03K 5/22
327/14
2007/0001111 A1* 1/2007 Rueb ........................ F16P 3/141
250/236

(Continued)

FOREIGN PATENT DOCUMENTS

CN 101893723 A 11/2010
CN 203204285 U 9/2013

(Continued)

OTHER PUBLICATIONS

The Chinese First Examination Report of corresponding China patent application No. 201611189393.0, dated Feb. 8, 2018.

*Primary Examiner* — Jefferey F Harold
*Assistant Examiner* — Justin B Sanders
(74) *Attorney, Agent, or Firm* — J.C. Patents

(57) ABSTRACT

The application provides a method and an apparatus for controlling a laser projection device, the laser projection device being provided with a thermoinduction sensor on housing for acquiring an infrared signal in environment where the laser projection device is located, the method including: acquiring first signal outputted by the thermoinduction sensor in first moment and second signal outputted in current moment, the first moment being prior to the current moment, first signal and second signal being signals outputted by the thermoinduction sensor according to the infrared signal; determining a first signal change rate according to first difference between first signal and second signal and second difference between first moment and current moment; reading a preset signal change rate and a threshold signal; determining an operation mode of laser projection device according to magnitude relation of first signal change rate and preset signal change rate, second signal and threshold signal.

20 Claims, 5 Drawing Sheets

(58) Field of Classification Search
USPC .......................................................... 348/189
See application file for complete search history.

(56) References Cited

U.S. PATENT DOCUMENTS

| | | | |
|---|---|---|---|
| 2013/0069994 A1* | 3/2013 | Nishigaki | H04N 9/3129 |
| | | | 345/690 |
| 2014/0289542 A1* | 9/2014 | Ishizu | H04N 9/3155 |
| | | | 713/320 |

FOREIGN PATENT DOCUMENTS

| | | | | |
|---|---|---|---|---|
| CN | 103576428 A | | 2/2014 | |
| CN | 105718025 A | * | 6/2016 | ............... G06F 1/32 |
| CN | 105718025 A | | 6/2016 | |

* cited by examiner

METHOD AND APPARATUS FOR CONTROLLING A LASER PROJECTION DEVICE

CROSS-REFERENCE TO RELATED APPLICATIONS

This application claims priority to Chinese Patent Application No. 201611189393.0, filed on Dec. 21, 2016, entitled "Method and Apparatus for Controlling a Laser Projection Device", which is hereby incorporated by reference in its entirety.

TECHNICAL FIELD

This application relates to the field of laser technologies and, more particularly, to a method and an apparatus for controlling a laser projection device.

BACKGROUND

With the continuous development of laser technologies, laser projection systems have been more and more widely used. A laser projection system can be a laser television, a laser projector and so on.

As a high-energy light source, the laser source has a high energy density, and its security is one of users' concerns during use. The laser projection system includes a laser projection device and a display screen. During the operation of the laser projection system, the laser emitted by the laser projection device is projected onto the display screen, and images are presented on the display screen. The laser emitted by the laser projection device has high luminance that can cause damage to human eyes when the human eyes are in the optical path of the laser.

SUMMARY

In a first aspect, the present application provides a method for controlling a laser projection device, the laser projection device being provided with a thermoinduction sensor on a housing thereof for acquiring an infrared signal in an environment where the laser projection device is located, where the method includes:

acquiring a first signal outputted by the thermoinduction sensor in a first moment and a second signal outputted by the thermoinduction sensor in a current moment, where the first moment is prior to the current moment, and the first signal and the second signal are signals outputted by the thermoinduction sensor according to the infrared signal;

determining a first signal change rate according to a first difference between the first signal and the second signal and a second difference between the first moment and the current moment;

reading a preset signal change rate and a threshold signal; and determining an operation mode of the laser projection device according to a magnitude relation of the first signal change rate and the preset signal change rate, the second signal and the threshold signal, where the operation mode includes a human eye protection mode and a viewing mode, and luminance of a laser source of the laser projection device is less than preset luminance under the human eye protection mode.

In a second aspect, the present application provides an apparatus for controlling a laser projection device, the laser projection device being provided with a thermoinduction sensor on a housing thereof for acquiring an infrared signal in an environment where the laser projection device is located, where the apparatus includes: a memory, configured to store instructions; a processor, coupled to the memory and configured to execute instructions stored in the memory, and the processor is configured to:

acquire a first signal outputted by the thermoinduction sensor in a first moment and a second signal outputted by the thermoinduction sensor in a current moment, where the first moment is prior to the current moment, and the first signal and the second signal are signals outputted by the thermoinduction sensor according to the infrared signal;

determine a first signal change rate according to a first difference between the first signal and the second signal and a second difference between the first moment and the current moment;

read a preset signal change rate and a threshold signal; and determine an operation mode of the laser projection device according to a magnitude relation of the first signal change rate and the preset signal change rate, the second signal and the threshold signal, where the operation mode includes a human eye protection mode and a viewing mode, and luminance of a laser source of the laser projection device is less than preset luminance under the human eye protection mode.

In a third aspect, the present application provides a laser projection device, the laser projection device being provided with a thermoinduction sensor on a housing thereof for acquiring an infrared signal in an environment where the laser projection device is located, where the laser projection device also includes: a memory, configured to store instructions; a processor, coupled to the memory and configured to execute instructions stored in the memory, and the processor is configured to:

acquire a first signal outputted by the thermoinduction sensor in a first moment and a second signal outputted by the thermoinduction sensor in a current moment, where the first moment is prior to the current moment, and the first signal and the second signal are signals outputted by the thermoinduction sensor according to the infrared signal;

determine a first signal change rate according to a first difference between the first signal and the second signal and a second difference between the first moment and the current moment;

read a preset signal change rate and a threshold signal; and determine an operation mode of the laser projection device according to a magnitude relation of the first signal change rate and the preset signal change rate, the second signal and the threshold signal, where the operation mode includes a human eye protection mode and a viewing mode, and luminance of a laser source of the laser projection device is less than preset luminance under the human eye protection mode.

BRIEF DESCRIPTION OF DRAWINGS

In order to illustrate the technical solutions of the present application or the related art more clearly, the following drawings, which will be used in the description of embodiments or the related art, will be briefly described, and it is obvious that the drawings in the following description are with respect to some embodiments of the present application. And according to these drawings further drawings may also be obtained by those skilled in the art without any creative effort.

DESCRIPTION OF EMBODIMENTS

In order to make the objectives, technical solutions and advantages of the present application clearer, the technical solutions of the present application will be clearly and comprehensively described below with reference to the accompanying drawings in this application. Obviously the embodiments to be described are a part of the embodiments of this application rather than all of them. All other embodiments obtained by those of ordinary skill in the art based on the embodiments of the present application without creative effort fall within the protection scope of the present application.

In the related art, in order to avoid damage to human eyes by a laser, it is common to provide a thermoinduction sensor on a housing of a laser projection device, and the induction range of the thermoinduction sensor covers the projection range of the laser path. The thermoinduction sensor may be a Hall sensor, an infrared sensor, or the like. When an output signal of the thermoinduction sensor is greater than a preset threshold signal, the laser projection device can take protective measures, e.g., shutting down the laser projection device, to prevent the human body from the laser hazard.

However, the inventors have found that sometimes when no human body enters the induction range of the thermoinduction sensor, there is still a case that the output signal of the thermoinduction sensor is greater than the preset threshold signal and the laser projection device takes protective measures.

Figure 1:
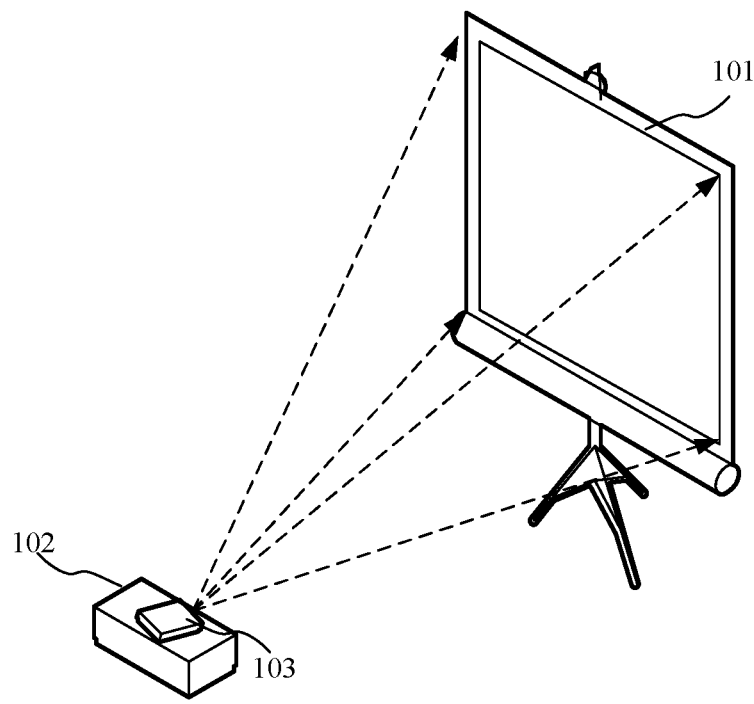
FIG. 1 is a schematic diagram of an application scenario of a method for controlling a laser projection device provided in some embodiments of the present application.

FIG. 1 is a schematic diagram of an application scenario of a method for controlling a laser projection device provided in some embodiments of the present application. Reference is made to FIG. 1, a display screen 101, a laser projection device 102 and a thermoinduction sensor 103 are included. The laser emitted by the laser projection device 102 is projected on the display screen 101 and images are presented on the display screen 101. The thermoinduction sensor 103 is arranged at the laser exit of the laser projection device 102. The thermoinduction sensor 103 has an induction range that can cover the projection range of an optical path of the laser projection device 102. The thermoinduction sensor 103 is used to acquire an infrared signal in the environment where the laser projection device is located. The thermoinduction sensor 103 may receive an infrared signal transmitted from an object within the induction range and determine an output signal according to the received infrared signal. As an implementation, the output signal may be a voltage signal. The thermoinduction sensor 103 transmits the output signal to a control apparatus (not shown in FIG. 1) of the laser projection device so that the control apparatus of the laser projection device controls the operation mode of the laser projection device in accordance with the output signal.

Figure 2:
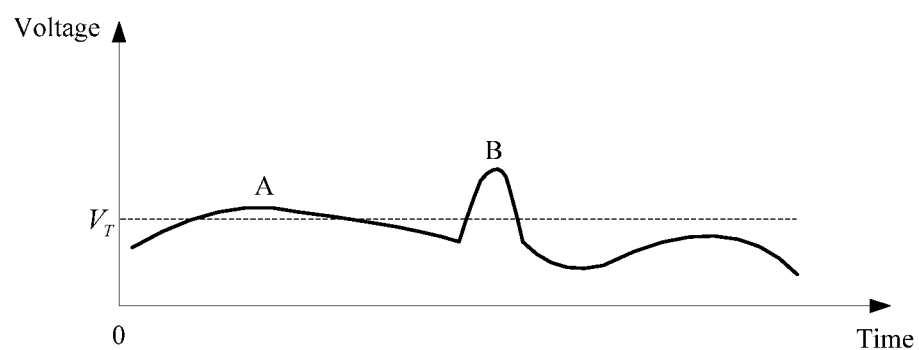
FIG. 2 is a schematic diagram of an output signal of a thermoinduction sensor provided in some embodiments of the present application.

In order to solve the above technical problems, the inventors have analyzed the operations of the thermoinduction sensor, and FIG. 2 is a schematic diagram of an output signal of a thermoinduction sensor provided in some embodiments of the present application. Referring to FIG. 2, the horizontal axis of the coordinate axis represents time, and the ordinate axis of the coordinate axis represents the voltage. The curve in FIG. 2 represents a voltage signal outputted from the thermoinduction sensor, and $V_T$ is a threshold voltage. As can be seen from FIG. 2, at point A and point B, the voltage of the voltage signal is greater than the threshold voltage. In the related art, the laser projection device will take protective measures at both point A and point B. However, the inventors have found that the voltage signal corresponding to point A is a voltage signal which is outputted by the thermoinduction sensor according to an infrared signal of a heat flow when the heat flow generated by the laser projection device is close to radiation temperature of the human body. The voltage signal corresponding to point B is a voltage signal which is outputted by the thermoinduction sensor 103 according to an infrared signal of a human body after the human body enters the induction region of the thermoinduction sensor 103.

The inventors found by comparing the environment in which the output signal of the thermoinduction sensor is generated and the output signal of the thermoinduction sensor that, if the human body enters the induction range of the thermoinduction sensor 103 in short time, the thermoinduction sensor 103 will output a signal with a high amplitude in short time according to the received infrared signal, so that the signal change rate of the output signal of the thermoinduction sensor is relatively large. The signal change rate is an amplitude change rate of the output signal. After the laser projection device generates heat through heating, the flow velocity of a heat flow formed when the heat is flowing to the external through a cooling system is usually relatively slow. Therefore, the increase of the amplitude of the signal which is outputted by thermoinduction sensor 103 according to the received infrared signal is also relatively slow, so that the signal change rate of the output signal of the thermoinduction sensor is relatively small.

In the present application, the inventors provided some technical solutions in which the control apparatus of the laser projection device can accurately determine, according to the output signal of the thermoinduction sensor and the signal change rate, whether a human body is within the induction range of the thermoinduction sensor 103, and then accurately control the operation mode of the laser projection device.

In the following, the technical solutions in the present application will be discussed in detail with reference to some embodiments. The following embodiments may be combined with one another, and the same or similar concepts or processes may not be repeated in certain embodiments.

Figure 3:
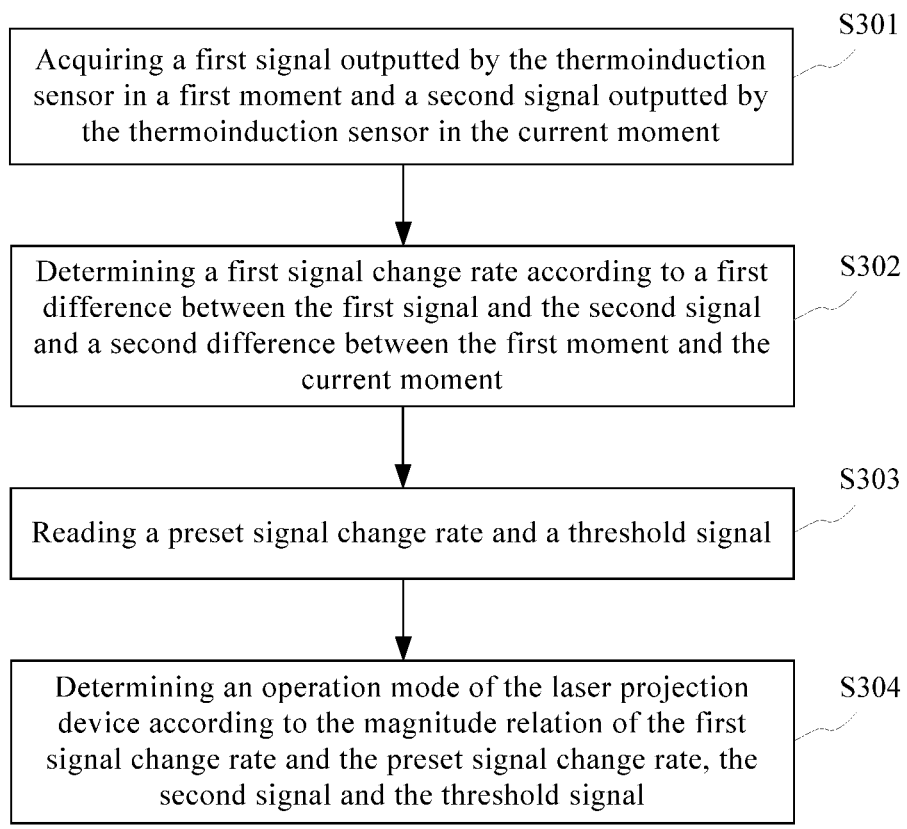
FIG. 3 is a flowchart of a method for controlling a laser projection device provided in some embodiments of the present application.

FIG. 3 is a flowchart of a method for controlling a laser projection device provided in some embodiments of the present application. Referring to FIG. 3, the method may include:

S301, acquiring a first signal outputted by a thermoinduction sensor in a first moment and a second signal outputted by the thermoinduction sensor in the current moment, where the first moment is prior to the current moment, and the first signal and the second signal are signals outputted by the thermoinduction sensor according to a received infrared signal.

The executive body of the present application may be a control apparatus of the laser projection device (hereinafter referred to as a control apparatus for short), which may be arranged in the laser projection apparatus. As an implementation, the control apparatus may be implemented by software and/or hardware.

The control apparatus may periodically implement the technical solution shown by the embodiment of FIG. 3 to accomplish the control over the laser projection device. As an implementation, the period may be 0.5 second, 1 second or the like, and the period may be set according to actual needs. The thermoinduction sensor can receive an infrared signal transmitted by an object within the induction range in real time and output a signal to the control apparatus in real time according to the received infrared signal.

When the control apparatus needs to control an operation mode of the laser projection device, the control apparatus acquires the output signal of the thermoinduction sensor, and acquires the first signal corresponding to the first moment and the second signal corresponding to the current moment from the output signal. The first moment is prior to the current moment and the time difference between the current moment and the first moment is a preset sampling interval. As an implementation, the preset sampling interval may be related to the induction sensitivity of the thermoinduction sensor. As an implementation, the preset sampling interval may be the same as the work cycle of the control apparatus. For example, the preset sampling interval may be 0.5 second, 1 second, etc., and the preset sampling interval may be set according to actual needs. As an implementation, the output signal from the thermoinduction sensor may be a voltage signal. In this implementation, the first signal, the second signal and a threshold signal are all voltage signals.

S302, determining a first signal change rate according to a first difference between the first signal and the second signal and a second difference between the first moment and the current moment.

The first signal change rate is determined according to the first signal, the second signal, and the time difference (i.e. the second difference) between the current moment and the first moment after the control apparatus acquires the first signal and the second signal. As an implementation, the control apparatus may determine the ratio of the first difference between the first signal and the second signal to the second difference between the current moment and the first moment to be the first signal change rate. Therefore, when the second signal is greater than the first signal, the first signal change rate is a positive number, and the first signal change rate is a negative number when the second signal is smaller than the first signal.

S303, reading a preset signal change rate and a threshold signal.

The preset signal change rate and the threshold signal are preset in the control apparatus so that the control apparatus can read the preset signal change rate and the threshold signal locally. As an implementation, the preset signal change rate may be 0.3V/s, and the threshold signal may be 1.5V, 2V, or the like. In practice, the preset signal change rate and the threshold signal can be set according to actual needs.

S304, determining the operation mode of the laser projection device according to a magnitude relation of the first signal change rate and the preset signal change rate, the second signal and the threshold signal.

The operation mode includes a human eye protection mode and a viewing mode. Under the human eye protection mode, luminance of a laser source of the laser projection device is less than preset luminance.

When the second signal is greater than the threshold signal, it might be the case that the human body enters the induction range of the thermoinduction sensor (the optical path range of the laser source) or the case that the temperature of a heat flow formed by heat generated by the laser projection device is quite close to the temperature radiated from the human body. Further, when the first signal change rate is greater than the preset signal change rate, it shows that a human body moves from outside of the induction range of the thermoinduction sensor to inside of the induction range of the thermoinduction sensor. When the first signal change rate is smaller than or equal to the preset signal change rate, it shows that there is no human body moving from outside of the induction range of the thermoinduction sensor to inside of the induction range of the thermoinduction sensor but that there is a heat flow temperature which is formed by the heat generated by the laser projection device and is quite close to the temperature radiated from the human body.

As an implementation, the control apparatus may determine the operation mode of the laser projection device to be the human eye protection mode when the control apparatus determines that the second signal is greater than the threshold signal and the first signal change rate is greater than the preset signal change rate. Otherwise, the control apparatus determines the operation mode of the laser projection device to be the viewing mode. When the operation mode of the laser projection device is the human eye protection mode, the laser source of the laser projection device emits laser with low luminance so that the laser emitted by the laser source has less damage to the human eyes, and the luminance of the laser emitted by the laser source under the human eye protection mode can be set according to actual needs.

In the method for controlling the laser projection device provided by the present application, the control apparatus may determine the first signal change rate according to the first difference between the first signal and the second signal and the second difference between the first moment and the current moment after acquiring the first signal outputted by the thermoinduction sensor in the first moment and the second signal outputted by the thermoinduction sensor in the current moment, and then accurately determine whether a human body has entered the projection range of the laser projection device according to the magnitude relation of the first signal change rate and the preset signal change rate, the second signal and the threshold signal, thereby determining the operation mode of the projection device to be the human eye protection mode or the viewing mode, rather than determining whether to activate the human eye protection mode merely according to the output signal of the thermoinduction sensor and preset threshold information. Therefore, by judging the magnitude relation of the first signal change rate and the preset signal change rate, the laser projection device can be prevented from erroneously activating the human eye protection mode, thereby improving the accuracy of the control over the laser projection device.

The following two implementations for determining (S304 in the embodiment shown in FIG. 3) the operation mode of the laser projection device according to the magnitude relation of the first signal change rate and the preset signal change rate, the second signal and the threshold signal are provided in some embodiments of the present application. Reference is made to embodiments shown in FIGS. 4 to 5.

Figure 4:
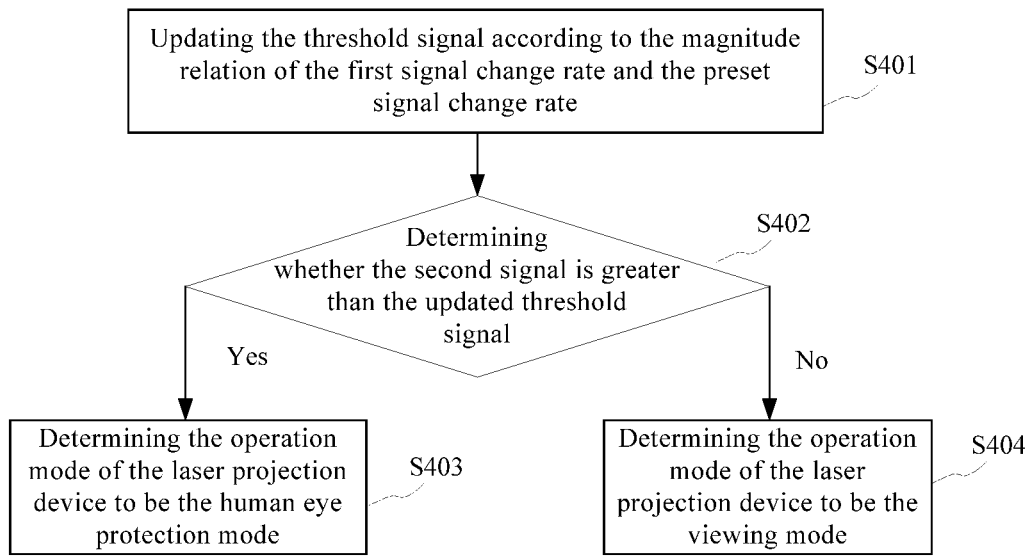
FIG. 4 is a flowchart of determining an operation mode of a laser projection device provided in some embodiments of the present application.

FIG. 4 is a flowchart of determining an operation mode of a laser projection device provided in some embodiments of the present application. Referring to FIG. 4, the method may include:

S401, updating the threshold signal according to the magnitude relation of the first signal change rate and the preset signal change rate.

In the embodiment shown in FIG. 4, threshold signals corresponding to different moments may be the same or different. For example, in moment 1, the threshold signal may be signal 1, and in moment 2, the threshold signal may be signal 2.

The control apparatus may judge whether the first signal change rate is greater than the preset signal change rate, and if the first signal change rate is greater than the preset signal change rate, determine the updated threshold signal to be equal to the threshold signal before being updated. If the first signal change rate is smaller than or equal to the preset signal change rate, the threshold signal $V_T$ can be updated according to the following formula 1, $$V_T = V_T \times \frac{V_2}{V_1}; \quad \text{formula 1}$$

where the $V_T$ is the threshold signal, the $V_1$ is the second signal, and the $V_2$ is the first signal.

S402, judging whether the second signal is greater than the updated threshold signal.

If yes, performing S403. If not, performing S404.

When the second signal is greater than the updated threshold signal, which shows that there is a human body moving from outside of the induction range of the thermoinduction sensor to inside of the induction range of the thermoinduction sensor, then performing S403.

When the second signal is smaller than or equal to the updated threshold signal, which shows that there is no human body moving from outside of the induction range of the thermoinduction sensor to inside of the induction range of the thermoinduction sensor, then performing S404.

S403, determining the operation mode of the laser projection device to be the human eye protection mode.

As an implementation, the control apparatus may first acquire the current operation mode of the laser projection device, and if the current operation mode of the laser projection device is the human eye protection mode, then the operation mode of the laser projection device may be maintained. If the current operation mode of the laser projection device is the viewing mode, then the operation mode of the laser projection device is adjusted from the viewing mode to the human eye protection mode. Under the human eye protection mode, the luminance of the laser source of the laser projection device is smaller than the preset luminance. As an implementation, the control apparatus may adjust the luminance of the laser source of the laser projection device to lower than the preset luminance so as to adjust the operation mode of the laser projection device to the human eye protection mode.

S404, determining the operation mode of the laser projection device to be the viewing mode.

As an implementation, the control apparatus may first acquire the current operation mode of the laser projection device, and if the current operation mode of the laser projection device is the viewing mode, then the operation mode of the laser projection device may be maintained. If the current operation mode of the laser projection device is the human eye protection mode, then the operation mode of the laser projection device is adjusted from the human eye protection mode to the viewing mode. As an implementation, the control apparatus may adjust the luminance of the laser source of the laser projection device to higher than the preset luminance so as to adjust the operation mode of the laser projection device to the viewing mode.

When the first signal change rate is smaller than or equal to the preset signal change rate, it shows that there is no human body moving from outside of the induction range of the thermoinduction sensor to inside of the induction range of the thermoinduction sensor. At this time, the second signal outputted by the thermoinduction sensor in the current moment is formed by the heat generated by the laser projection device, and therefore, in order to prevent the control apparatus from making an erroneous determination, which results in erroneous triggering on the human eye protection mode of the laser projection system, when the second signal is greater than the threshold signal, the threshold signal may be updated such that the second signal is smaller than the updated threshold signal.

In the following, by taking the output signal of the thermoinduction sensor being a voltage signal as an example, the embodiment shown in FIG. 4 will be discussed in detail by way of example with reference to a schematic diagram of an output signal of a thermoinduction sensor shown in FIG. 5.

Figure 5:
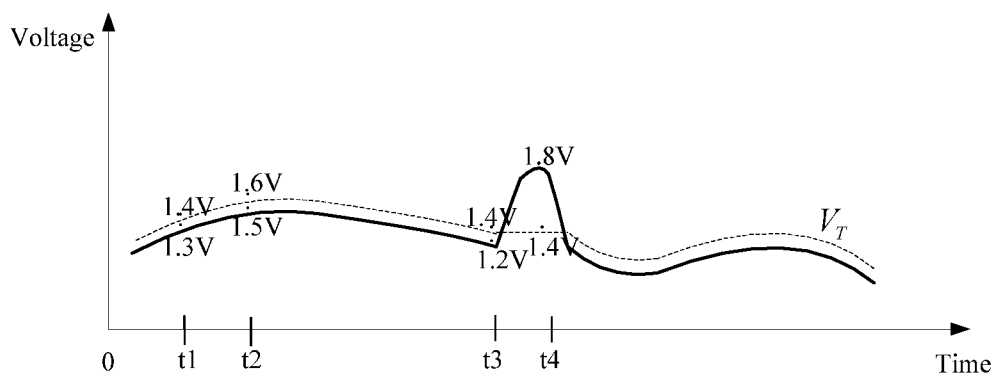
FIG. 5 is a schematic diagram of an output signal of a thermoinduction sensor provided in some other embodiments of the present application.

FIG. 5 is a schematic diagram of an output signal of a thermoinduction sensor provided in some other embodiments of the present application. Reference is made to FIG. 5, the horizontal axis of the coordinate axis represents time, and the ordinate axis of the coordinate axis represents the voltage. The solid curve in FIG. 5 represents a voltage signal outputted from the thermoinduction sensor. And the dashed curve in FIG. 5 represents a threshold voltage corresponding to respective moment.

In moment t2, when the control apparatus needs to control the laser projection device, the control apparatus acquires the voltage 1 (1.5V) of the output signal of the thermoinduction sensor in moment t2 and the voltage 2 (1.3V) of the output signal of the thermoinduction sensor in moment t1. Assuming that the time difference between t2 and t1 is 1 second, then the control apparatus can determine that the voltage change rate between moment t1 and moment t2 is 0.2V/s.

Assuming that a preset voltage change rate is 0.3V/s, the control apparatus determines that the voltage change rate (0.2V/s) between moment t1 and moment t2 is smaller than the preset voltage change rate (0.3V/s), it shows that in moment t2, there is no human body moving from outside of the induction range of the thermoinduction sensor to inside of the induction range of the thermoinduction sensor. At this time, the voltage 1 outputted by the thermoinduction sensor in moment t2 is formed by the heat generated by the laser projection device. Further, the control apparatus can read the threshold voltage. At this time, the threshold voltage read by the control apparatus is determined by the control apparatus in moment t1. Assuming that the threshold voltage in moment t1 is 1.4V, the control apparatus updates the threshold voltage according to voltage 1 (1.5V) and voltage 2 (1.3V) to prevent the control apparatus from making an erroneous determination, which results in erroneous triggering on the human eye protection mode of the laser projection system, when voltage 1 is greater than the threshold voltage. The updated threshold voltage $V_T$ is:

$$V_T = 1.4 \times \frac{1.5}{1.3} = 1.6 \text{ V}.$$

In moment t2, the threshold voltage is updated from 1.4V in moment t1 to 1.6V. After the threshold voltage is updated, the control apparatus determines that the voltage 1 (1.5V) in moment t2 is smaller than the threshold voltage (1.6V), therefore the control apparatus determines the operation mode of the laser projection device to be the viewing mode.

In moment t4, when the control apparatus needs to control the laser projection device, the control apparatus acquires the voltage 3 (1.8V) of the output signal of the thermoinduction sensor in moment t4 and the voltage 4 (1.2V) of the output signal of the thermoinduction sensor in moment t3. Assuming that the time difference between t4 and t3 is 1 second, then the control apparatus can determine that the voltage change rate between moment t3 and moment t4 is 0.6V/s.

Assuming that the preset voltage change rate is 0.3V/s, the control apparatus determines that the voltage change rate (0.6V/s) between moment t3 and moment t4 is greater than the preset voltage change rate (0.3V/s), it shows that in moment t4, there is a human body moving from outside of the induction range of the thermoinduction sensor to inside of the induction range of the thermoinduction sensor. Further, the control apparatus may read the threshold voltage. At this time, the threshold voltage read by the control apparatus is determined by the control apparatus in moment t3. Assuming that the threshold voltage in moment t3 is 1.4V, since the voltage change rate (0.6V/s) between moment t3 and moment t4 is greater than the preset voltage change rate (0.3V/s), the control apparatus determines the threshold voltage in moment t4 to be equal to the threshold voltage in moment t3, that is, the control apparatus determines the threshold voltage in moment t4 to be 1.4V.

As the control apparatus determines that the voltage 1 (1.8V) is greater than the threshold voltage (1.4V), the control apparatus may determine the operating mode of the laser projection device to be the human eye protection mode, and the control apparatus may control the laser source to decrease the luminance of the emitted laser.

In the embodiment shown in FIG. 4, the threshold signal is dynamically adjusted through the signal change rate corresponding to the output signals of the thermoinduction sensor in the current moment and in "the moment prior to the current moment". Thus the control apparatus can be prevented from making an erroneous determination and adjusting the operation mode of the laser projection device to the human eye protection mode mistakenly when the second signal is greater than the threshold signal, thereby improving the accuracy of the control over the operation mode of the laser projection device.

Figure 6:
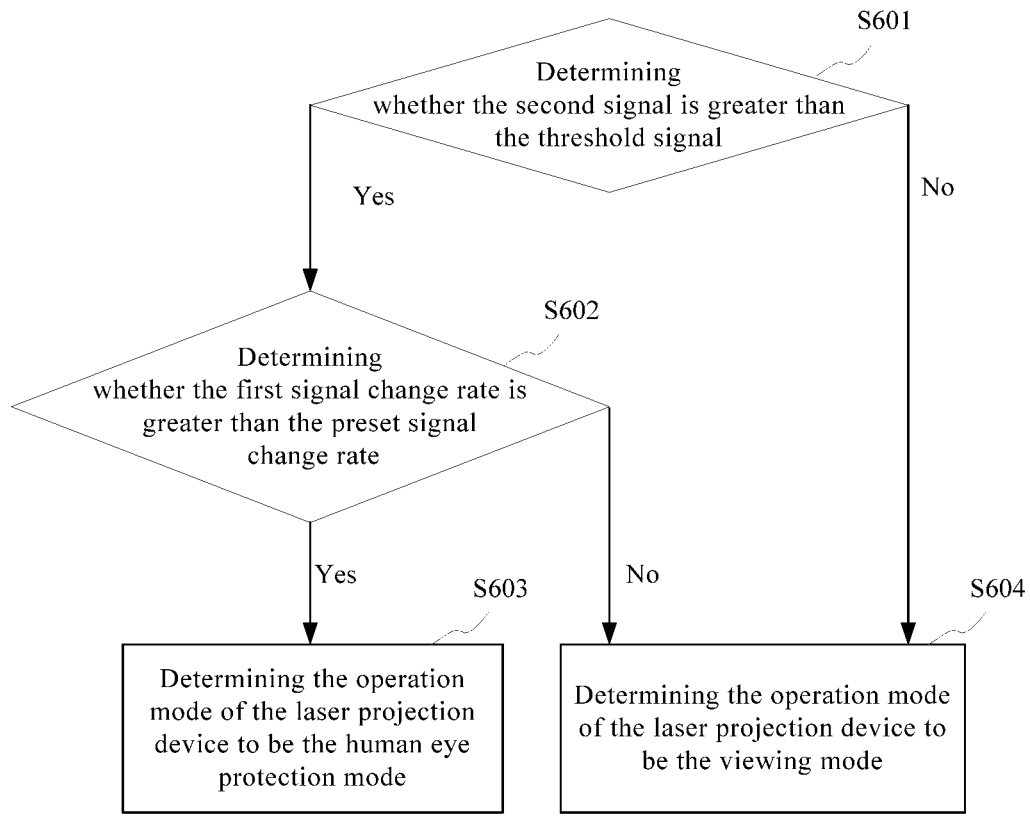
FIG. 6 is a flowchart of determining an operation mode of a laser projection device provided in some other embodiments of the present application.

FIG. 6 is a flowchart of determining an operation mode of a laser projection device provided in some other embodiments of the present application. Referring to FIG. 6, the method may include:

S601, judging whether the second signal is greater than the threshold signal.

If yes, performing S602-S604. If not, performing S604.

In the embodiment shown in FIG. 6, the threshold signal is a fixed value, and the threshold signals corresponding to all the moments are the same.

S602, judging whether the first signal change rate is greater than the preset signal change rate.

If yes, performing S603.

If not, performing S604.

S603, determining the operation mode of the laser projection device to be the human eye protection mode.

It should be noted that reference can be made to S403 in the embodiment of FIG. 4 to understand the execution process of S603, and the description thereof will not be repeated here.

S604, determining the operation mode of the laser projection device to be the viewing mode.

It should be noted that reference can be made to S404 in the embodiment of FIG. 4 to understand the execution process of S604, and the description thereof will not be repeated here.

In the embodiment shown in FIG. 6, when the control apparatus determines that the second signal is smaller than the threshold signal, it shows that there is no human body moving from outside of the induction range of the thermoinduction sensor to inside of the induction range of the thermoinduction sensor. Therefore, the operation mode of the laser projection device can be directly determined to be the viewing mode. When the control apparatus determines that the second signal is greater than or equal to the threshold signal, i.e., when there may be a human body moving from outside of the induction range of the thermoinduction sensor to the inside of the induction range of the thermoinduction sensor, the control apparatus may further determine the operation mode of the laser projection device according to the magnitude relation of the first signal change rate and the preset signal change rate, and thus may cause the control apparatus to quickly control the laser projection device.

In some embodiments of the present application, an implementation is provided. After the control apparatus determines the operation mode of the laser projection device to be qthe human eye protection mode, the control apparatus may determine a maintenance period for the human eye protection mode according to the moment when the operation mode of the laser projection device is determined to be the human eye protection mode and a preset duration. And during the maintenance period, the operation mode of the laser projection device remains to be the human eye protection mode. As an implementation, the maintenance period for the human eye protection mode may be a period corresponding to a preset duration after the operation mode of the laser projection device is determined to be the human eye protection mode. An exemplary preset duration may be 30 seconds, one minute, and so on. As an implementation, the control apparatus may suspend the operation during the maintenance period, and thus may reduce the burden on the control apparatus.

Figure 7:
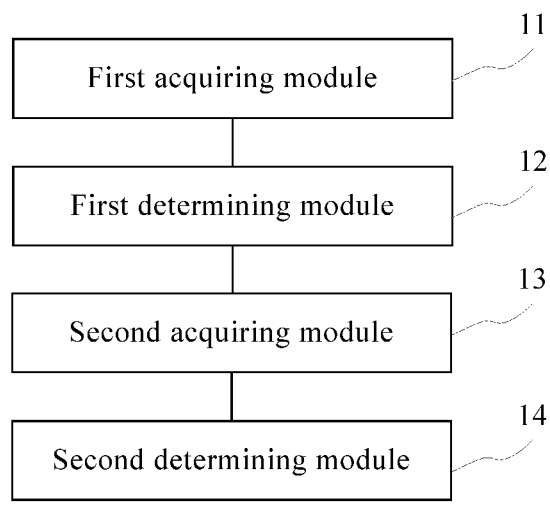
FIG. 7 is a schematic structural diagram of an apparatus for controlling a laser projection device provided in some embodiments of the present application.

FIG. 7 is a schematic structural diagram of an apparatus for controlling a laser projection device provided in some embodiments of the present application. The apparatus is applied to a laser projection device, the housing of which is provided with a thermoinduction sensor for acquiring an infrared signal in an environment where the laser projection device is located. Reference is made to FIG. 7, the apparatus includes:

a first acquiring module 11, configured to acquire a first signal outputted by the thermoinduction sensor in a first moment and a second signal outputted by the thermoinduction sensor in the current moment, where the first moment is prior to the current moment, and the first signal and the second signal are signals outputted by the thermoinduction sensor according to the infrared signal;

a first determining module 12, configured to determine a first signal change rate according to a first difference between the first signal and the second signal and a second difference between the first moment and the current moment;

a second acquiring module 13, configured to read a preset signal change rate and a threshold signal;

a second determining module 14, configured to determine an operation mode of the laser projection device according to a magnitude relation of the first signal change rate and the preset signal change rate, the second signal and the threshold signal. The operation mode includes a human eye protection mode and a viewing mode. Under the human eye protection mode, the luminance of a laser source of the laser projection device is less than preset luminance.

The apparatus for controlling the laser projection device provided by the present application can perform the technical solutions shown in the method embodiments described above, the implementing principle and the beneficial effects thereof being similar, which will not be repeated here.

Figure 8:
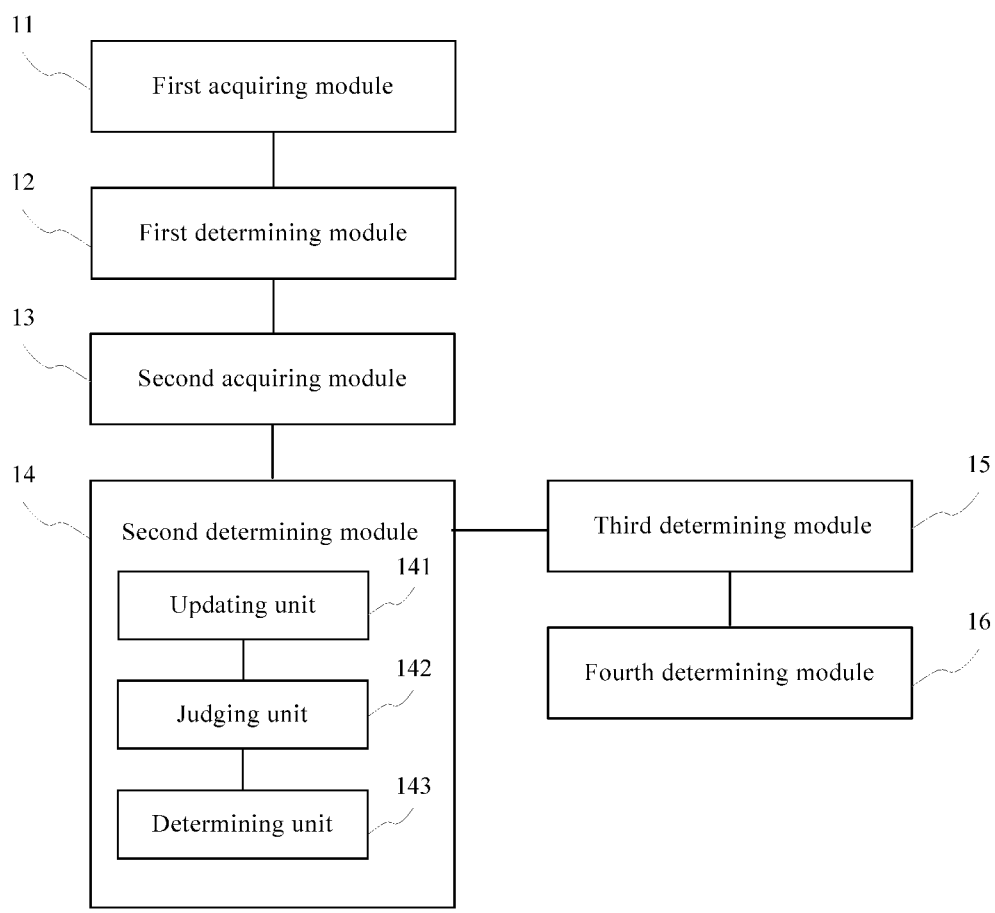
FIG. 8 is a schematic structural diagram of an apparatus for controlling a laser projection device provided in some other embodiments of the present application.

FIG. 8 is a second schematic structural diagram of an apparatus for controlling a laser projection device provided in some embodiments of the present application. On the basis of the embodiments shown in FIG. 7, reference is made to FIG. 8 and the second determining module 14 includes an updating unit 141, a judging unit 142 and a determining unit 143.

The updating unit 141 is configured to update the threshold signal according to a magnitude relation of the first signal change rate and the preset signal change rate;

the judging unit 142 is configured to judge whether the second signal is greater than the updated threshold signal;

the determining unit 143 is configured to determine the operation mode of the laser projection device to be the human eye protection mode when the judging unit 142 determines that the second signal is greater than the updated threshold signal. The determining unit 143 is further configured to determine the operation mode of the laser projection device to be the viewing mode when the judging unit 142 determines that the second signal is smaller than or equal to the updated threshold signal.

In a possible implementation, the updating unit 141 is configured to:

judge whether the first signal change rate is greater than the preset signal change rate;

if the first signal change rate is greater than the preset signal change rate, determine the updated threshold signal to be equal to the threshold signal before being updated;

if the first signal change rate is smaller than or equal to the preset signal change rate, update the threshold signal $V_T$ according to the following formula 1, $$V_T = V_T \times \frac{V_2}{V_1}; \quad \text{formula 1}$$

where the $V_T$ is the threshold signal, the $V_1$ is the second signal, and the $V_2$ is the first signal.

In another possible implementation, the second determining module 14 is configured to:

judge whether the second signal is greater than the threshold signal;

if the second signal is greater than the threshold signal, judge whether the first signal change rate is greater than the preset signal change rate; if the second signal is greater than the threshold signal and the first signal change rate is greater than the preset signal change rate, then determine the operating mode of the laser projection device to be the human eye protection mode; if the second signal is greater than the threshold signal and the first signal change rate is smaller than or equal to the preset signal change rate, then determine the operating mode of the laser projection device to be the viewing mode;

if the second signal is smaller than or equal to the threshold signal, then determine the operation mode of the laser projection device to be the viewing mode.

In another possible implementation, the apparatus further includes a third determining module 15 and a fourth determining module 16.

The third determining module 15 is configured to determine a maintenance period for the human eye protection mode according to the moment when the operation mode of the laser projection device is determined to be the human eye protection mode and a preset duration after the second determining module 14 determines the operation mode of the laser projection device to be the human eye protection mode;

the fourth determining module 16 is configured to maintain the operation mode of the laser projection device in the human eye protection mode during the maintenance period.

The apparatus for controlling the laser projection device provided by the present application can perform the technical solutions shown in the method embodiments described above, the implementing principle and the beneficial effect thereof being similar, which will not be repeated here.

The present application further provides an apparatus for controlling a laser projection device. The laser projection device is provided with a thermoinduction sensor on the housing thereof for acquiring an infrared signal in an environment where the laser projection device is located. The apparatus includes: a memory, configured to store instructions; a processor, coupled to the memory and configured to execute instructions stored in the memory, and the processor is configured to:

acquire a first signal outputted by the thermoinduction sensor in a first moment and a second signal outputted by the thermoinduction sensor in the current moment, where the first moment is prior to the current moment, and the first signal and the second signal are signals outputted by the thermoinduction sensor according to the infrared signal; determine a first signal change rate according to a first difference between the first signal and the second signal and a second difference between the first moment and the current moment; read a preset signal change rate and a threshold signal; and determine an operation mode of the laser projection device according to a magnitude relation of the first signal change rate and the preset signal change rate, the second signal and the threshold signal, where the operation mode includes a human eye protection mode and a viewing mode, and luminance of a laser source of the laser projection device is less than preset luminance under the human eye protection mode.

The processor in the apparatus for controlling the laser projection device of this embodiment may further be configured to perform any of the methods for controlling the laser projection devices provided in the foregoing embodiments of the present application, which is similar in principle and will not be repeated herein.

The present application further provides a laser projection device. The laser projection device is provided with a thermoinduction sensor on the housing thereof for acquiring an infrared signal in an environment where the laser projection device is located. The laser projection device also includes: a memory, configured to store instructions; a processor, coupled to the memory and configured to execute instructions stored in the memory, and the processor is configured to:

acquire a first signal outputted by the thermoinduction sensor in a first moment and a second signal outputted by the thermoinduction sensor in the current moment, where the first moment is prior to the current moment, and the first signal and the second signal are signals outputted by the thermoinduction sensor according to the infrared signal; determine a first signal change rate according to a first difference between the first signal and the second signal and a second difference between the first moment and the current moment; read a preset signal change rate and a threshold signal; and determine an operation mode of the laser projection device according to a magnitude relation of the first signal change rate and the preset signal change rate, the second signal and the threshold signal, where the operation mode includes a human eye protection mode and a viewing mode, and luminance of a laser source of the laser projection device is less than preset luminance under the human eye protection mode.

The processor in the laser projection device of this embodiment may further be configured to perform any of the methods provided in the foregoing embodiments of the present application, which is similar in principle and will not be repeated herein.

It will be appreciated by those of ordinary skill in the art that all or part of the steps of implementing the above method embodiments may be accomplished by a program instructing relevant hardware. The foregoing program may be stored in a computer readable storage medium. When the program is executed, the steps including the foregoing method embodiments are executed; and the foregoing storage medium includes various kinds of mediums capable of storing program codes, such as a ROM (read only memory), a RAM (random access memory), a magnetic disk, or an optical disk.

Finally, it should be noted that the above embodiments are merely intended for explaining, rather than limiting, the technical solutions of the present application. While the present application has been discussed in detail with reference to the foregoing embodiments, it will be understood by those of ordinary skill in the art that, it is possible to modify the technical solutions described in the foregoing embodiments, or substitute some or all of the technical features equivalently, and these modifications and substitutions do not render the essence of the corresponding technical solutions depart from the scope of the technical solutions of the embodiments in the present application.

What is claimed is:

1. A method for controlling a laser projection device, the laser projection device being provided with a thermoinduction sensor on a housing thereof for acquiring an infrared signal within an induction range which covers a projection range of a laser path of the laser projection device, wherein the method comprises:

acquiring a first signal outputted by the thermoinduction sensor in a first moment and a second signal outputted by the thermoinduction sensor in a current moment, wherein the first moment is prior to the current moment, and the first signal and the second signal are signals outputted by the thermoinduction sensor according to the infrared signal;

determining a first signal change rate according to a first difference between the first signal and the second signal and a second difference between the first moment and the current moment; and making luminance of a laser source of the laser projection device less than a preset luminance when the first signal change rate is greater than a preset signal change rate and the second signal is greater than a threshold signal.

2. The method according to claim 1, wherein an operation mode of the laser projection device comprises a human eye protection mode, and the luminance of the laser source of the laser projection device is less than the preset luminance under the human eye protection mode;

the making luminance of a laser source of the laser projection device less than a preset luminance when the first signal change rate is greater than a preset signal change rate and the second signal is greater than a threshold signal comprises:

determining the operating mode of the laser projection device to be the human eye protection mode when the second signal is greater than the threshold signal and the first signal change rate is greater than the preset signal change rate.

3. The method according to claim 2, wherein the operation mode of the laser projection device further comprises a viewing mode, and the luminance of the laser source of the laser projection device is not less than the preset luminance under the viewing mode, the method further comprises:

determining the operating mode of the laser projection device to be the viewing mode when the second signal is not greater than the threshold signal or the first signal change rate is not greater than the preset signal change rate.

4. The method according to claim 2, wherein after determining the operation mode of the laser projection device to be the human eye protection mode, the method further comprises:

determining a maintenance period for the human eye protection mode according to a moment when the operation mode of the laser projection device is determined to be the human eye protection mode and a preset duration; and maintaining the operation mode of the laser projection device in the human eye protection mode during the maintenance period.

5. An apparatus for controlling luminance of a laser projection device, the laser projection device being provided with a thermoinduction sensor on a housing thereof for acquiring an infrared signal within an induction range which covers a projection range of a laser path of the laser projection device, wherein a screen is provided within the projection range of the laser path of the laser projection device for projecting images, wherein the apparatus comprises: a memory, configured to store instructions; a processor, coupled to the memory and configured to execute instructions stored in the memory, and the processor is configured to:

acquire a first signal which corresponds to the infrared signal within the induction range and is outputted by the thermoinduction sensor in a first moment and a second signal which corresponds to the infrared signal within the induction range and is outputted by the thermoinduction sensor in a current moment, wherein the first moment is prior to the current moment, and the first signal and the second signal are signals outputted by the thermoinduction sensor according to the infrared signal;

determine a first signal change rate according to a first difference between the first signal and the second signal and a second difference between the first moment and the current moment; and make luminance of a laser source of the laser projection device less than a preset luminance when the first signal change rate is greater than a preset signal change rate and the second signal is greater than a threshold signal.

6. The apparatus according to claim 5, wherein an operation mode of the laser projection device comprises a human eye protection mode, and the luminance of the laser source of the laser projection device is less than the preset luminance under the human eye protection mode, and the processor is configured to:

determine the operating mode of the laser projection device to be the human eye protection mode when the second signal is greater than the threshold signal and the first signal change rate is greater than the preset signal change rate.

7. The apparatus according to claim 6, wherein the operation mode of the laser projection device further comprises a viewing mode, and the luminance of the laser source of the laser projection device is not less than the preset luminance under the viewing mode, and the processor is configured to:

determine the operating mode of the laser projection device to be the viewing mode when the second signal is not greater than the threshold signal or the first signal change rate is not greater than the preset signal change rate.

8. The apparatus according to claim 6, wherein the processor is further configured to:

determine a maintenance period for the human eye protection mode according to a moment when the operation mode of the laser projection device is determined to be the human eye protection mode and a preset duration; and maintain the operation mode of the laser projection device in the human eye protection mode during the maintenance period.

9. A laser projection device, the laser projection device being provided with a thermoinduction sensor on a housing thereof for acquiring an infrared signal within an induction range which covers a projection range of a laser path of the laser projection device, wherein the laser projection device also comprises: a memory, configured to store instructions; a processor, coupled to the memory and configured to execute instructions stored in the memory, and the processor is configured to:

acquire a first signal outputted by the thermoinduction sensor in a first moment and a second signal outputted by the thermoinduction sensor in a current moment, wherein the first moment is prior to the current moment, and the first signal and the second signal are signals outputted by the thermoinduction sensor according to the infrared signal;

determine a first signal change rate according to a first difference between the first signal and the second signal and a second difference between the first moment and the current moment; and make luminance of a laser source of the laser projection device less than a preset luminance when the first signal change rate is greater than a preset signal change rate and the second signal is greater than a threshold signal.

10. The method according to claim 1, wherein after determining a first signal change rate according to a first difference between the first signal and the second signal and a second difference between the first moment and the current moment, the method further comprises:

updating the threshold signal to make the updated threshold signal greater than the second signal when the first signal change rate is not greater than the preset signal change rate;

the making luminance of a laser source of the laser projection device less than a preset luminance when the first signal change rate is greater than a preset signal change rate and the second signal is greater than a threshold signal comprises:

making the luminance of the laser source of the laser projection device less than the preset luminance when the first signal change rate is greater than the preset signal change rate and the second signal is greater than the updated threshold signal.

11. The method according to claim 10, wherein the threshold signal is updated according to formula 1 when the first signal change rate is not greater than the preset signal change rate, $$V_T = V_T \times \frac{V_2}{V_1}, \quad \text{formula 1}$$

wherein the $V_T$ on the left of the "=" is the updated threshold signal, the $V_T$ on the right of the "=" is the threshold signal, the $V_1$ is the second signal, and the $V_2$ is the first signal.

12. The method according to claim 1, wherein the preset signal change rate is a positive value.

13. The method according to claim 1, wherein the first signal change rate is a ratio of a variation between the first signal and the second signal to duration between the first moment and the current moment.

14. The apparatus according to claim 5, wherein after determining a first signal change rate according to a first difference between the first signal and the second signal and a second difference between the first moment and the current moment, the processor is further configured to:

update the threshold signal to make the updated threshold signal greater than the second signal when the first signal change rate is not greater than the preset signal change rate; and make the luminance of the laser source of the laser projection device less than the preset luminance when the first signal change rate is greater than the preset signal change rate and the second signal is greater than the updated threshold signal.

15. The apparatus according to claim 14, wherein the threshold signal is updated according to formula 1 when the first signal change rate is not greater than the preset signal change rate, $$V_T = V_T \times \frac{V_2}{V_1}, \quad \text{formula 1}$$

wherein the $V_T$ on the left of the "=" is the updated threshold signal, the $V_T$ on the right of the "=" is the threshold signal, the $V_1$ is the second signal, and the $V_2$ is the first signal.

16. The apparatus according to claim 5, wherein the preset signal change rate is a positive value.

17. The apparatus according to claim 5, wherein the first signal change rate is a ratio of a variation between the first signal and the second signal to duration between the first moment and the current moment.

18. The method according to claim 1, wherein the thermoinduction sensor is configured to periodically implement sampling of infrared signals when the laser projection device is in an operation mode.

19. The apparatus according to claim 5, wherein the thermoinduction sensor is configured to periodically implement sampling of infrared signals when the laser projection device is in an operation mode.

20. The laser projection device according to claim 9, wherein the thermoinduction sensor is configured to periodically implement sampling of infrared signals when the laser projection device is in an operation mode.

* * * * *